Aug. 3, 1943.   J. C. WIRTHMAN   2,325,992
BLACKOUT DEVICE
Filed Jan. 7, 1942   3 Sheets-Sheet 1

INVENTOR.
John C. Wirthman.
BY Corbett, Mahoney & Miller
ATTORNEYS

INVENTOR.
John C. Wirthman.
BY Corbett, Mahoney & Miller
ATTORNEYS

Aug. 3, 1943.    J. C. WIRTHMAN    2,325,992
BLACKOUT DEVICE
Filed Jan. 7, 1942    3 Sheets-Sheet 3

INVENTOR.
John C. Wirthman.
BY Corbett, Mahoney & Miller

ATTORNEYS

Patented Aug. 3, 1943

2,325,992

UNITED STATES PATENT OFFICE 2,325,992

BLACK-OUT DEVICE

John C. Wirthman, Delaware, Ohio

Application January 7, 1942, Serial No. 425,912

7 Claims. (Cl. 160—29)

My invention relates to a blackout device. It has to do, more particularly, with a blackout blind which is mounted in a novel manner and in such a way that no light can escape from the interior of a room around the edges of the blind to the outside.

At present it is customary to paint windows of a home or factory so that no light can escape during a blackout. Another method is to hang blankets or other heavy material over windows and doorways so that no light will escape. It can be seen that in a building of any kind where daylight is needed it is very undesirable to paint the windows to prevent the escape of light during the night blackout. This is especially true of factories and larger buildings since no light could enter the windows during the daytime, thus, making necessary a greater use of power and electricity to light the building at all times. Insofar as the use of blankets and other similar materials in a factory or large building is concerned, it is apparent that this method is impractical because of the time necessary to apply and remove the blankets. Furthermore, this latter type of blacking out a building is not very efficient since light escapes around the edges of the blankets. Many other disadvantages are present in the prior art, due to the faulty and inefficient methods which make it necessary to turn lights out in a building during a blackout.

One of the objects of my invention is to provide a blackout blind which will seal the light in a room or building without the slightest danger of any light being observable from the outside.

Another object of my invention is to provide a blackout blind of such a nature that it can be quickly pulled down to shut out the light on a moment's notice.

Another object of my invention is to provide a blackout blind that can be assembled in relation to a window with a minimum of parts so that it will fit into the scheme of the room and will not create an unsightly appearance in the room.

Another object of my invention is to provide a blackout blind which has reinforced backing material sewed thereon to prevent in many cases shattered glass, shrapnel and other flying objects from entering the room and thus, prevent injury which might result to the occupants.

Another object of my invention is to provide a blind which is so positioned in channel members along the sides of the window or door opening that the blind will not be blown from its position by concussions created by nearby explosions and, therefore, will prevent, in many cases, fragments of flying steel, glass and other objects from being blown into the room or factory.

Many other objects will be apparent from the following description.

In its preferred form, my invention contemplates a blackout device which can be used in any building, large or small. It is particularly useful in factory buildings where it is necessary on a moment's notice to black out the entire building. In my device, I provide channel members associated with the sides and bottom of a window or door frame and a covering means at the top of the window frame for enclosing a blind roll which carries a blackout blind. The channel members prevent the escape of light from the side edges of the blind as well as the bottom and the covering means prevents the light from escaping around the blind roll and the upper corners of the blind. The blind may be constructed of any suitable material but heavy pyroxylin coated fabrics are preferable since this type of goods is less likely to wear and will withstand tearing to a greater extent than the usual blind material.

It is understood that while I show and describe my blackout device in association with a window frame, it will be just as effective when used on doors or other openings such as ventilators or skylights. It is apparent that I provide a blackout device which can be quickly and easily adjusted to the open and closed positions and which has many advantages over those used in the past.

The preferred embodiment of my invention is illustrated in the accompanying drawings wherein similar characters of reference designate corresponding parts and wherein.

Figure 1:
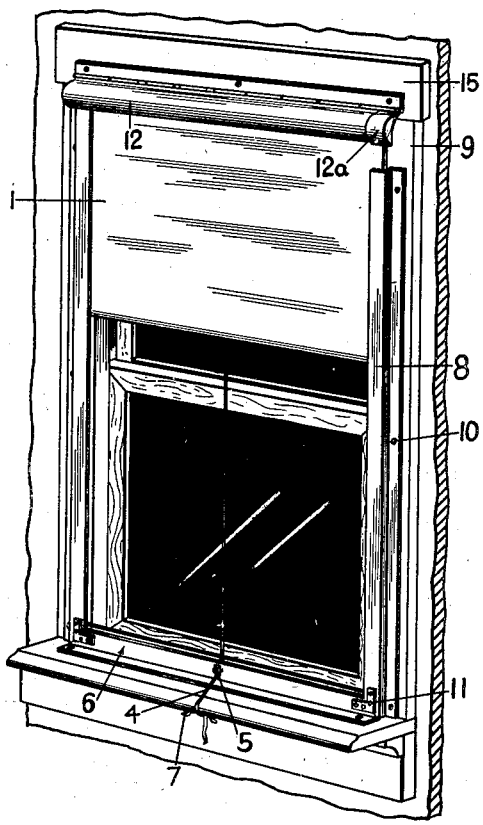
Figure 1 is a perspective view, partly broken away, of a roller type blind constructed according to my invention in association with a window frame.
Figure 2:
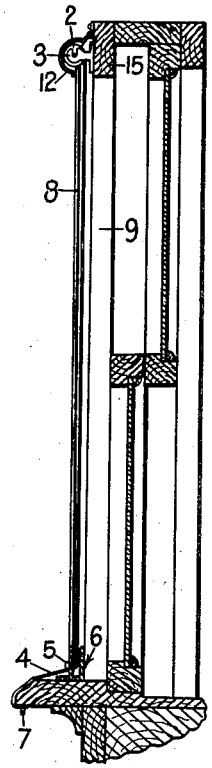
Figure 2 is a vertical sectional view showing my blackout blind in closed position.

With reference to the drawings, I have illustrated my device associated with a window frame of the conventional type. It may also be associated with a door frame. My device comprises a blind member of the roller type which is shown in a partly closed position in Figure 1.

The flexible blind member 1 is mounted in the conventional manner on a blind roll 2 and held in position by means of the usual type bracket members 3. The blind has a cord member 4 attached to its lower edge. This cord member 4 is threaded over a pulley 5 carried by a horizontal channel member 6 disposed on the window sill. The cord 4 is adapted to be pulled through the opening provided by said pulley member 5 and wound around a bracket member 7 disposed on the window sill.

Figures 3, 4:
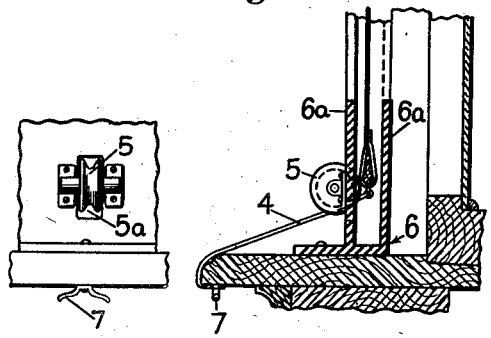
Figure 3 is a detail in front elevation of a pulley and bracket mechanism used at the bottom of the blind.
Figure 4 is a detail in vertical section of the lower portion of my structure.

The blind 1 has its side edges disposed in vertical channel members 8 which are suitably mounted on the window frame 9 by means of screw 10. The vertical channel members 8 cooperate with the horizontal channel members 6 at the bottom of the window frame in the manner shown in Figure 1 to provide a completely closed channel about the sides and bottom of the blind. L-shaped angles 11 hold the members 6 and 8 together. The channel member 6 at the bottom of the window frame is best shown in Figure 4. This channel member has a pair of upstanding flanges 6a to which the blind is guided until its lower edge is opposite the pulley opening 5a. There is no danger of light escaping through the opening 5a to the outside since the outer flange 6a extends a substantial distance above the pulley opening. It can be seen that since the channel members 6 and 8 overlap a substantial portion of the blind at each of its side edges and at the bottom thereof, no light can escape from the inside of the room through the window when the blind is pulled down into its final closed position.

Figure 5:
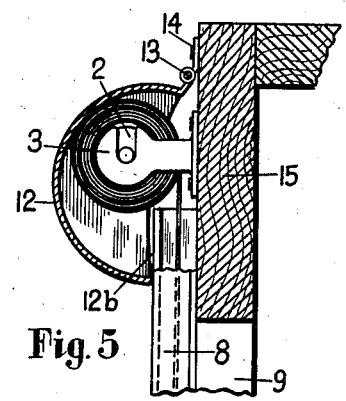
Figure 5 is a vertical sectional view of the top portion of the blind structure.

At the top of the blind, the blind roll 2 is disposed within an arcuate shape shield member 12. This member 12 is shown in detail in Figure 5 of the drawings. The vertical side channel members 8 extend into this shield member 12, through openings 12b adjacent the ends thereof. They extend upwardly into member 12 a substantial extent and fit tightly in openings 12a so that no light can escape. The member 12 is hingedly attached at 13 to a bracket member 14. The bracket member 14 is mounted on the upper part of the window frame 15. The construction of the member 12 is such that the member always bears against the blind roll 2 with the blind disposed thereon. When the blind is in the lower or closed position, the blind roll will naturally be smaller and the hinge 13 allows the member 12 to maintain contact with the smaller size blind roll by its own weight. No light can escape around the outside of the blind roll. Since the bracket member 14 is carried by the window frame, the blind roll 2 is completely encased within the member 12. When the blind is raised by the conventional spring disposed in the roll member, the member 12 will be swung upwardly about the hinge, as the blind winds around the roll member 2, but will always be in light-proof contact with the blind.

It will be apparent from the above description and drawings that I have provided a blind device having many advantages. The main advantage of the device is that it prevents seepage of light around either the side, top or bottom edges of the blind member. Another advantage is that the blackout blind can be easily and quickly manipulated from the open to the closed position. Another advantage is that relatively few changes will be necessary to assemble the blackout device in association with any size window. While I have shown this blackout blind associated with the usual home type or office window, it will be understood that the same principles and structure can be applied to large or small factory windows.

Figure 13:
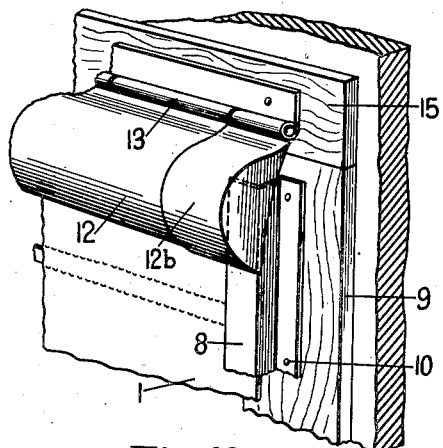
Figure 13 is a perspective view showing a cover adapted to enclose the blind roll.
Figure 14:
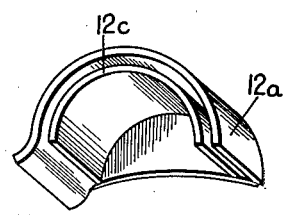
Figure 14 is a perspective view of a portion of the cover.

In this latter connection I show the top shield member 12 as being in two sections in Figures 1, 13 and 14. This is to allow the shield member 12 to be fitted onto different size windows by merely cutting the one end thereof and attaching an end piece 12a shown in Figure 14. The piece 12a has an inner flange 12b which allows the end piece 12a to be readily slipped on the cut end of the member 12.

Figure 9:
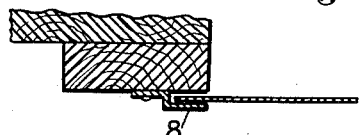
Figure 9 is a horizontal sectional view showing the side channel member attached to the inside edge of the window frame.
Figure 10:
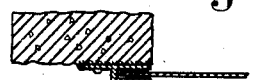
Figure 10 shows a modification of a side channel member attached to a rough surface such as stone.

Figures 9, 10, 11 and 12 illustrate different types of channel members which can be used in different types of applications. In Figure 9, the channel member is shown as used in Figure 1 of my device. In Figure 10, I illustrate a channel member 8a having a much wider flange portion than the one shown in Figure 9. This type of channel member 8a is used where the channels are to be attached to rough surfaces such as stone or brick walls where there is a possibility that the rough edges of the wall would allow light to seep through to the outside. Furthermore, in Figure 10 the channel member 8a may have cement disposed around it so as to prevent the escape of light.

Figure 11:
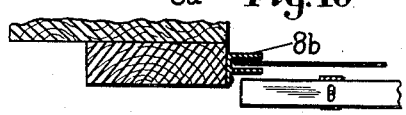
Figure 11 is a modification of the channel member which is adapted to be positioned between a Venetian blind and the window pane.
Figure 12:
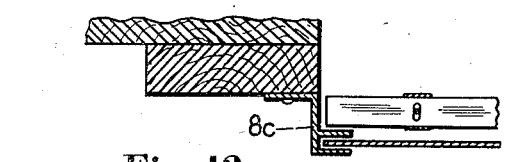
Figure 12 is a modification of the channel member with the blackout blind positioned on the inside of the Venetian blind.

Figures 11 and 12 show channel members adapted to be used in combination with a Venetian blind of the conventional type. In Figure 11 the channel member 8b is disposed between the window sash and the Venetian blind. In Figure 12, the channel member 8c has an extended portion which allows the Venetian blind to be disposed between the blackout blind and the window sash.

Figure 6:
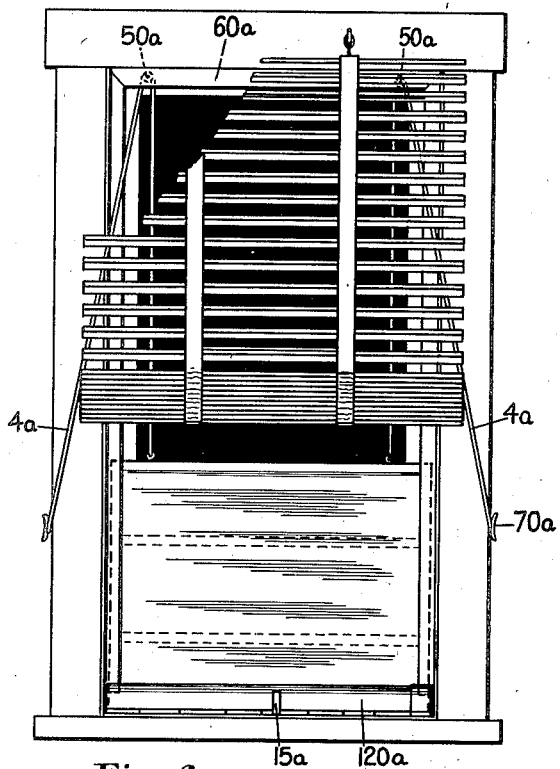
Figure 6 is a front elevational view, partly broken away, showing the blackout blind constructed according to my invention in combination with a conventional type Venetian blind.
Figure 7:
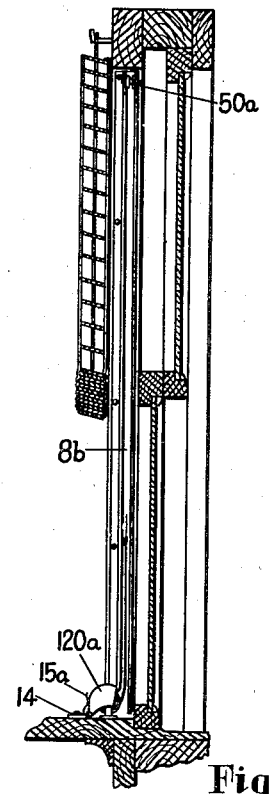
Figure 7 is a vertical sectional view of the blind shown in Figure 6.
Figure 8:
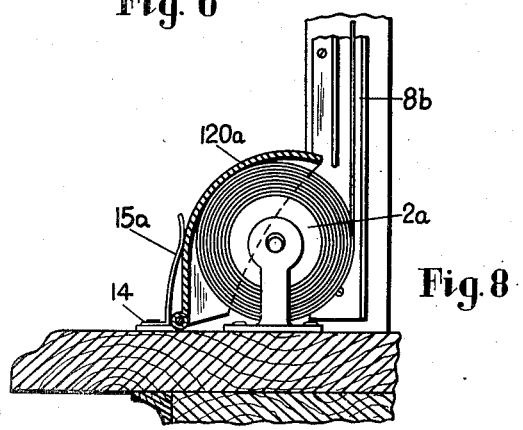
Figure 8 is a detail view in vertical section of the blind roll and associated parts used in connection with the type of blind shown in Figure 6.

In Figure 6 my blackout blind device is shown in association with a Venetian blind. In this construction, it will be apparent that the Venetian blind will hide the blackout device to a great extent. The construction of the channel members at the side of the blind is the same as described before. However, the top and bottom channel members of this modification are reversed from their positions described in connection with Figure 1, that is, the roll is at the bottom and the channel is at the top. This arrangement is made so that the blackout blind will not interfere in any way with the operation of the Venetian blind. In this type of structure, it is necessary to have a pair of cord members 4a for pulling the blind upwardly instead of downwardly, as previously described. A pair of pulley members 50a are mounted in the upper channel members 60a and a pair of bracket members 70a are disposed at the sides of the window frame. The blind roll 2a is disposed at the bottom of the window frame and the arcuate shape shield member 120a is forced inwardly by means of a spring 15 mounted on the bracket 14, as shown in Figure 8. The member 120a operates in the same manner at the bottom of the frame as it did in the form shown in Figure 1 except that it is necessary that a spring member 15 be provided to keep the member 12 in contact with the roll member 2a as the blind roll diminishes in size.

In connection with this construction, it is preferable to have rigid horizontal strips 1a provided at intervals to keep the blind from sagging or folding and thus, making it difficult to manipulate.

Figures 15, 16:
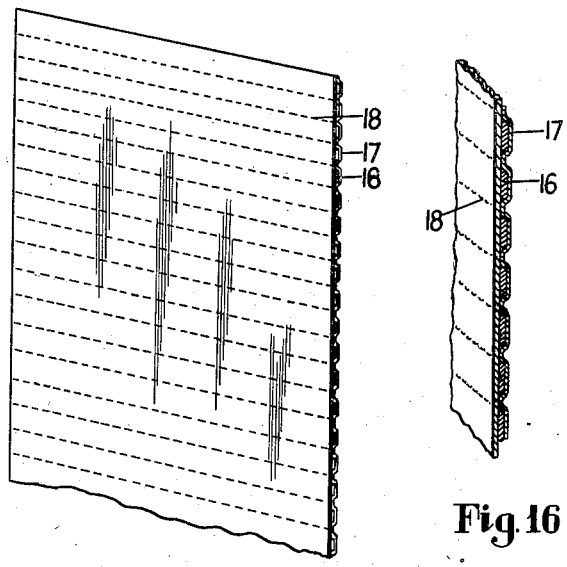
Figure 15 is a perspective view of my blackout blind with metal or wood reinforcing members secured on the back thereof.
Figure 16 is a perspective view of the edge of the blind showing the front side of the blind.
Figure 17:
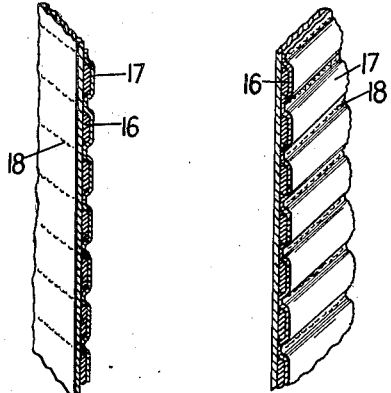
Figure 17 is a similar view showing the back side of the blind.

Figures 15, 16 and 17 illustrate another modification of my device. These figures illustrate a blind with thin metal or thin wooden strips fastened onto the back of the blind in such a manner that it can be rolled in the same way as the blind described in connection with Figure 1. Referring to Figure 15, it will be seen that the blind is smooth on its inner side. Figure 16 shows the metal strips 16 held in position by a piece of fabric 17 sewed in horizontal rows 18 to form sockets for the strip. These strips 16 are spaced apart as shown in both Figures 16 and 17 so that the blind may be rolled onto a roll member. The advantage of having the blind constructed in this manner is apparent since the metal or wooden strips 16 will greatly aid in preventing fragments of glass from entering the interior of the factory or room through the windows covered by the blind. It will also prevent concussion from pulling the blind out of the channel members if the window is open or broken. While these reinforcing strips will make a much safer blind than that previously described, it will still be possible to open and close the blind as quickly and easily as the blind previously described.

It will be seen from the above description that I have provided a blackout device having many advantages and other advantages will be apparent from the drawings and the following claims.

In the following claims where I refer to a window, it is to be understood that I intend to cover the use of my device with doors and other openings.

Having thus described my invention, what I claim is:

1. A blockout device of the type described comprising a blind member mounted on a blind roll at the top of a window frame, channel members disposed on said frame along the sides and at the bottom thereof, said channel members extending a substantial distance inwardly around the edges of the blind and adapted to hold the blind therebeneath, and an arcuate shape covering member disposed about the blind roll at the top of the window frame, said covering member adapted to bear against said blind roll, said side channel members extending into said covering means forming a seal through which no light can escape.

2. A blackout device of the type described comprising a blind member mounted on a blind roll at one end of the window frame, channel members disposed on said frame along the sides, and at one end thereof, said channel member extending a substantial distance inwardly around the edges of the blind and adapted to hold the blind therebeneath, and an arcuate shaped covering member disposed about the blind roll, said covering member being hinged and adapted to contact with said roll as the roll increases or diminishes in size due to the winding or unwinding of the blind on the roll.

3. A blackout device according to claim 2, wherein a pulley member is mounted in the end channel member, and a cord attached to said blind and associated with said pulley for raising and lowering the blind.

4. A blackout device according to claim 2, wherein thin strips of reinforcing material are secured to the back of the blind member.

5. A blackout device of the type described comprising a blind member mounted on a blind roll at the bottom of a window frame, channel members disposed on said window frame at the sides and top thereof, means being provided whereby the blind may be moved into association with said channel members to seal light in a room, covering means adapted to fit over said blind roll at the bottom of the window frame, said covering means being hinged, a spring member adapted to bear against said covering means to keep it in contact with said roll when the size of the blind roll is increased or diminished due to the raising or lowering of the blind.

6. A blackout device according to claim 5, wherein a pair of pulley members are mounted on the top channel member, and a pair of cords attached to the blind are associated with said pulleys for raising and lowering said blind.

7. A blackout device according to claim 5 wherein the blind member has horizontal supporting strips disposed at vertically spaced intervals to keep the blind taut.

JOHN C. WIRTHMAN.